United States Patent
Robinson

(10) Patent No.: US 9,102,554 B2
(45) Date of Patent: Aug. 11, 2015

(54) CONTINUOUS FLOW ELECTROFLOCCULATION WATER TREATMENT SYSTEM

(76) Inventor: Vivian Robinson, Canterbury (AU)

(*) Notice: Subject to any disclaimer, the term of this patent is extended or adjusted under 35 U.S.C. 154(b) by 3 days.

(21) Appl. No.: 14/115,837

(22) PCT Filed: May 3, 2012

(86) PCT No.: PCT/AU2012/000478
§ 371 (c)(1),
(2), (4) Date: Feb. 25, 2014

(87) PCT Pub. No.: WO2012/151617
PCT Pub. Date: Nov. 15, 2012

(65) Prior Publication Data
US 2014/0311920 A1   Oct. 23, 2014

(30) Foreign Application Priority Data

May 6, 2011  (AU) ................................ 2011202095

(51) Int. Cl.
*C02F 1/461*  (2006.01)
*C02F 1/463*  (2006.01)

(52) U.S. Cl.
CPC ............ *C02F 1/46104* (2013.01); *C02F 1/463* (2013.01); *C02F 2201/4614* (2013.01); *C02F 2209/40* (2013.01); *C02F 2209/42* (2013.01)

(58) Field of Classification Search
CPC ...... C02F 1/463; C02F 1/465; C02F 2209/42; C02F 2209/40; C02F 2201/4614
See application file for complete search history.

(56) References Cited

U.S. PATENT DOCUMENTS

| 3,944,478 A | 3/1976 | Kuji et al. | |
|---|---|---|---|
| 5,531,865 A * | 7/1996 | Cole | 205/751 |
| 2003/0106854 A1* | 6/2003 | Robinson | 210/748 |
| 2005/0230321 A1 | 10/2005 | Berrak et al. | |
| 2007/0131621 A1 | 6/2007 | Denton | |
| 2010/0326841 A1 | 12/2010 | Blum | |
| 2011/0000790 A1* | 1/2011 | Wood et al. | 204/553 |

FOREIGN PATENT DOCUMENTS

| CN | 2837295 Y | 11/2006 |
|---|---|---|
| EP | 0668244 A1 | 8/1995 |
| FR | 2780962 A1 | 1/2000 |

OTHER PUBLICATIONS

International Search Report from related PCT Application No. PCT/AU2012/000478.
European Search Report dated Sep. 19, 2014 in related European Patent Application No. 12 78 1572.
Office Action dated Oct. 21, 2014 in related Chinese Patent Application No. 201280030068.3.

* cited by examiner

*Primary Examiner* — Keith Hendricks
*Assistant Examiner* — Steven A. Friday
(74) *Attorney, Agent, or Firm* — Eric L. Lane; Green Patent Law

(57) ABSTRACT

A method is disclosed in which water is pumped continuously into one end of a container, the pollutants are captured and floated to the surface, the treated and cleaned water flows out the other end and the floated pollutants are removed. In one embodiment, the system consists of at least one container that has a set of electrically active plates and a mechanism for capturing and removing the pollutants that are floated to the surface by the electrically active plates. Multiple containers can be connected in series and used for similar or separate purposes to remove the pollutants. In another embodiment, the single container is partitioned into a multiple of chambers. Each chamber can be used for a similar or separate purpose, which purpose depends upon the application. In both embodiments, the primary reaction consists of electroflocculation, in which a low voltage is applied across a set of metal plates. This liberates metal ions and gas bubbles. The metal ions capture the pollutants and the gas bubbles float them to the surface. The whole process is done In a manner In which the floated pollutants form a stable layer on the surface of the flowing water. Different sets of metal plates can be used in separate chambers to remove different pollutants. The voltage to the plates is controlled in such a manner as to provide a known charge dose to the water as It passes through the apparatus at a Known rate. This is controlled by monitoring and controlling both the rate at which the water flows and the rate at which the electric charge Is imparted through the water.

In operation water is pumped into the first chamber where ft is treated with the first set of plates. It can then flow into a second chamber, with a barrier mechanism that limits the surface floe from flowing with it. This process can be repeated in other chambers until the water is adequately treated with different sets of plates. The water can then flow into additional chambers in which much of the residual floe and bubbles floats to the surface. Each chamber has a wall over which the floe can flow into a drain mechanism, and a mechanism for getting the floe to flow over the wall. In this manner these continuous flow electroflocculation water treatment systems operate like a membrane free filter or a chemical free dissolved air flotation system.

18 Claims, 7 Drawing Sheets

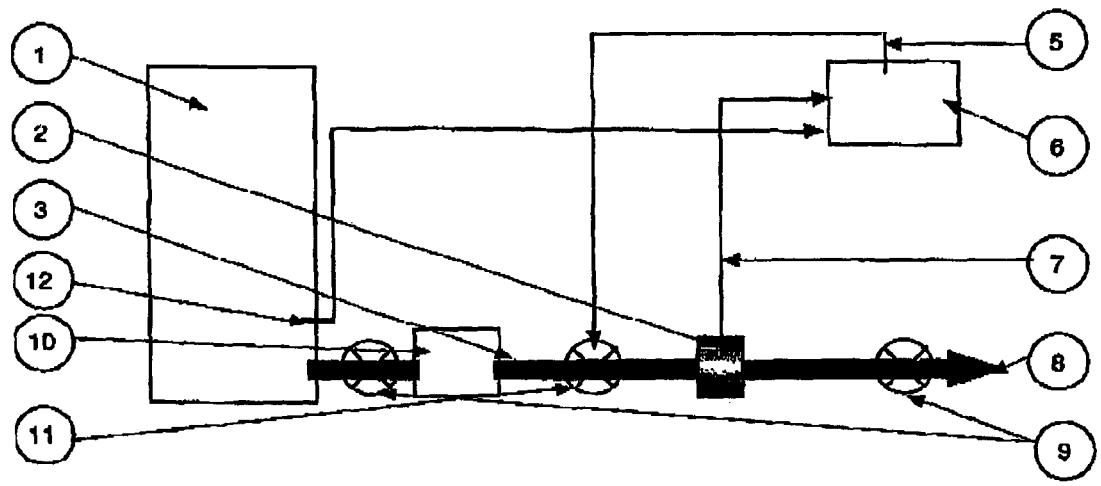
Figure 1  An illustration of one method of giving a constant water flow that can be controlled.
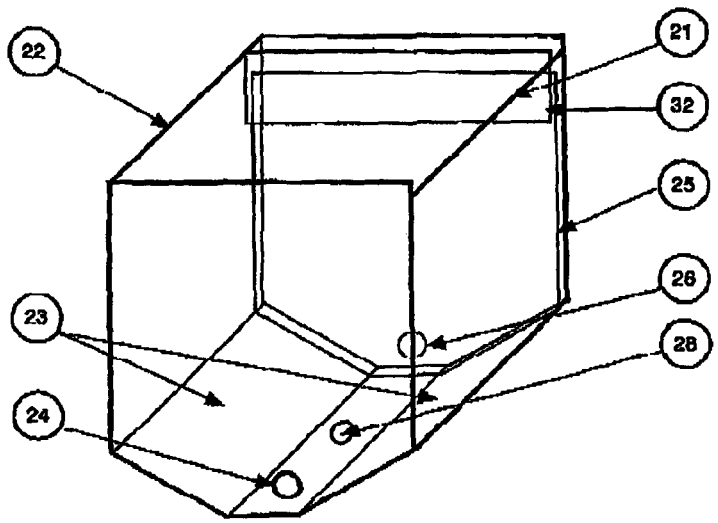
Figure 2  Oblique end elevation one embodiment of the apparatus showing some features of a container suitable for the process.

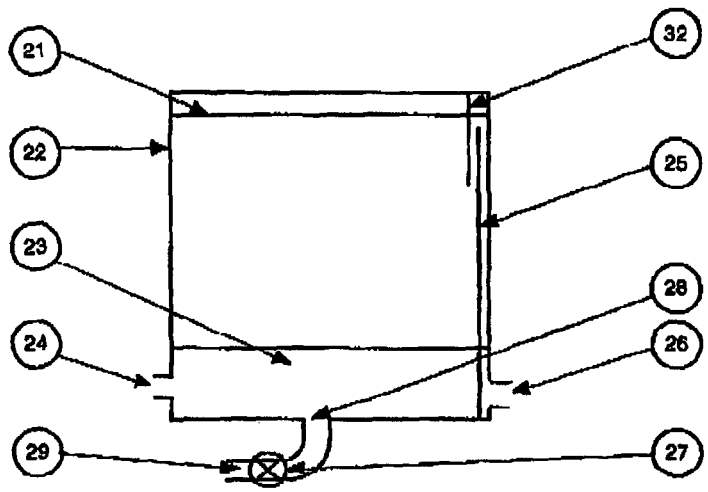
Figure 3  Side elevation view of the same embodiment of the apparatus in Figure 1
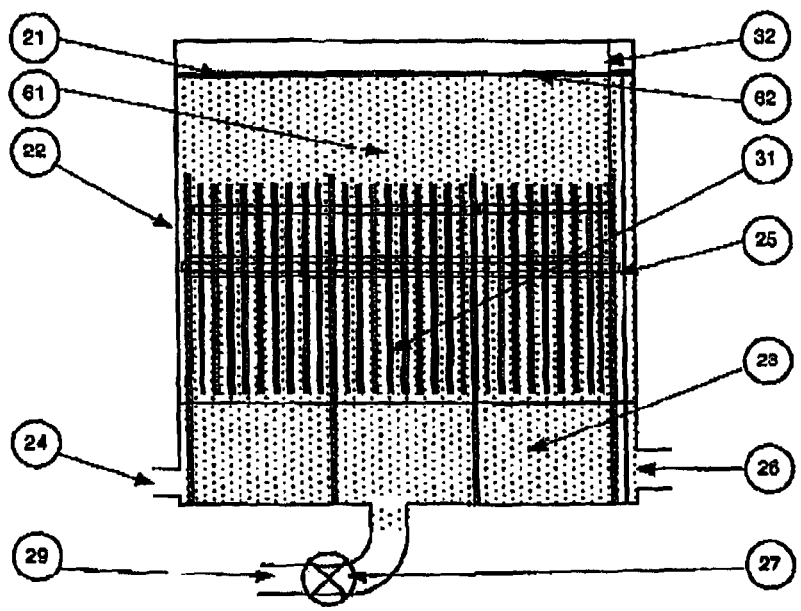
Figure 4  Side sectional view of the arrangement of electrically active plates within the apparatus container of the embodiment in Figures 1 and 2

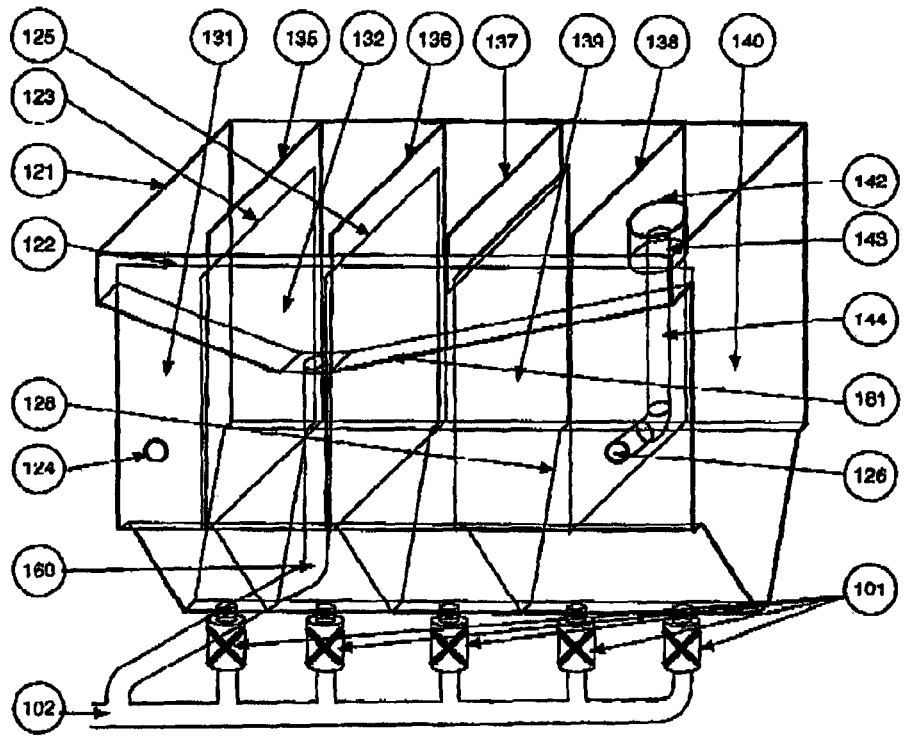
Figure 9    Oblique sectional composite view of apparatus illustrated in figure 7
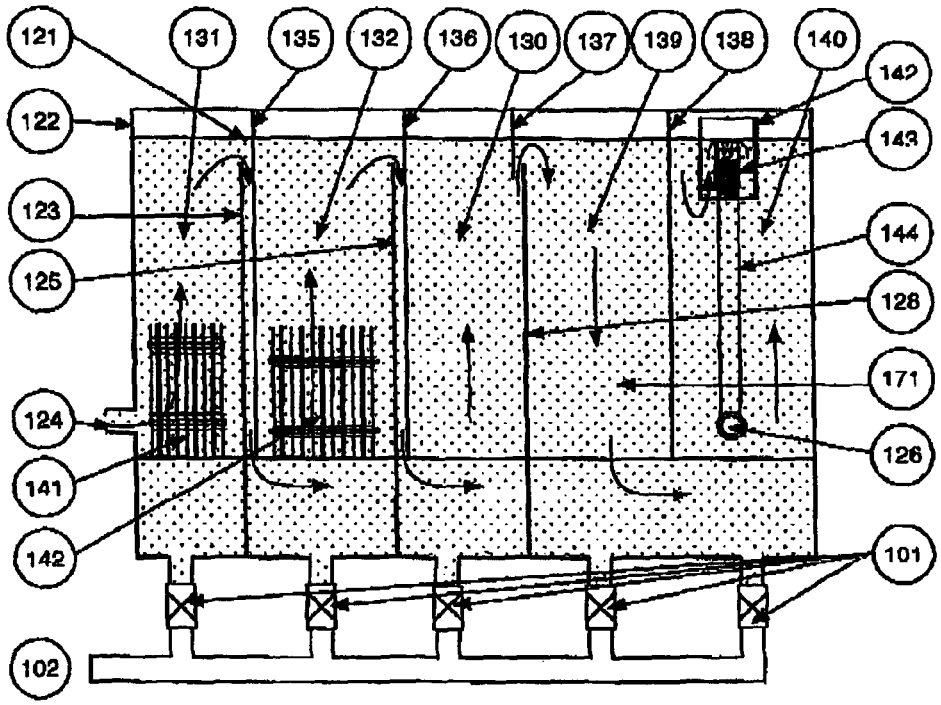
Figure 10    Detail of the role of partitions/barriers in directing water flow to reduce floc passage from one chamber to the next.

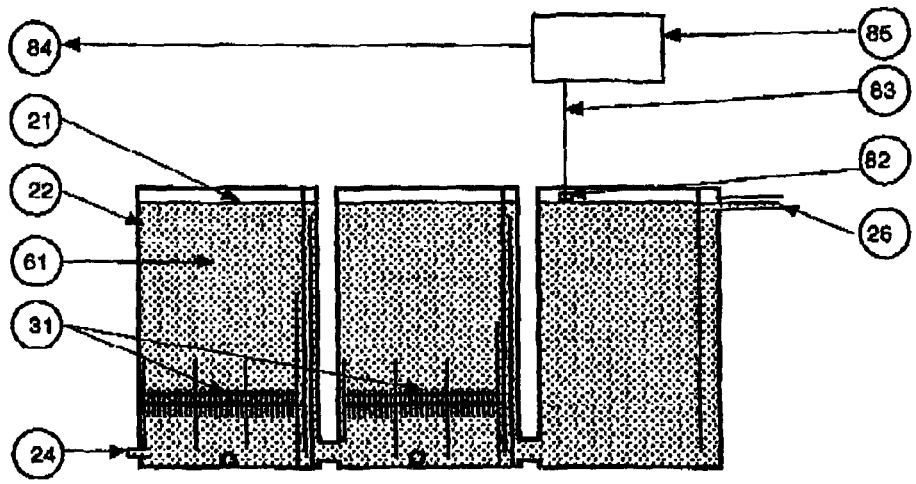
Figure 11  An illustration of a controlled water level mechanism
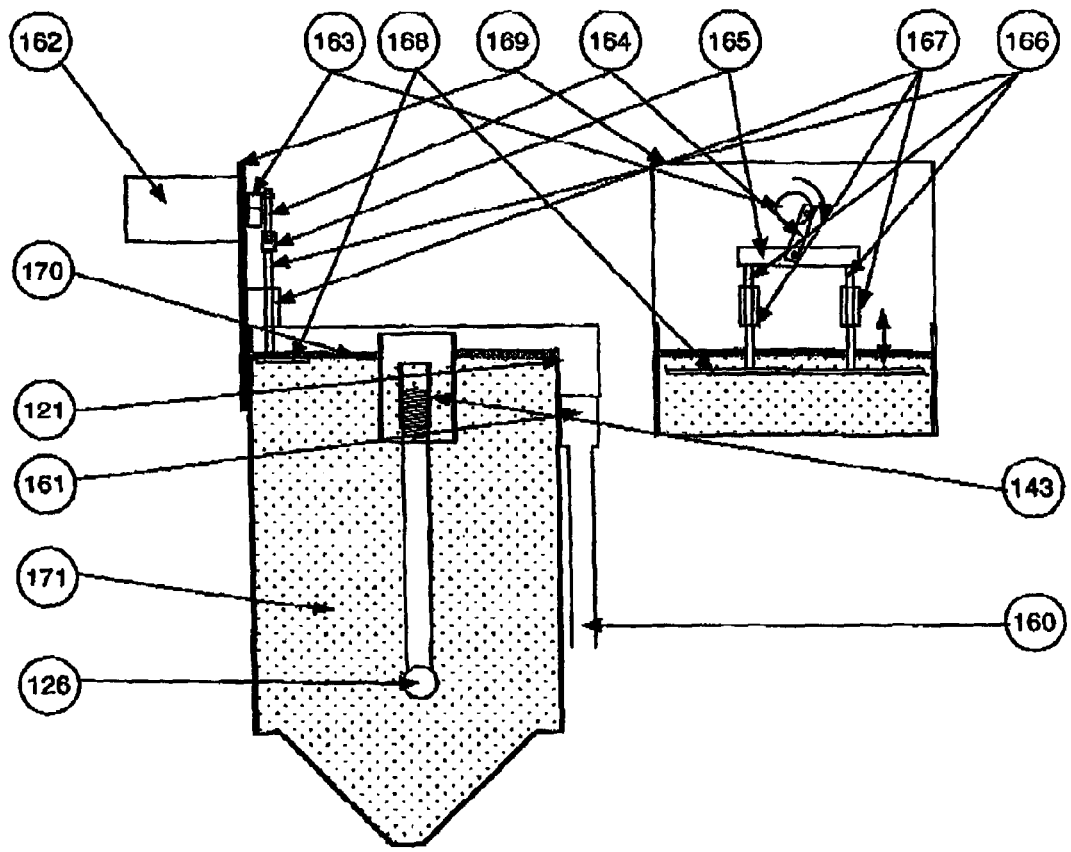
Figure 12  Illustration of one mechanism of generating a wave to remove the floc from the container.

CONTINUOUS FLOW ELECTROFLOCCULATION WATER TREATMENT SYSTEM

BACKGROUND

Increasing population and industrialization of the world's economies means the demand for fresh clean water for use has increased while the supply has decreased because of the increased pollution of many fresh water sources. In an attempt to overcome this, there has been the realization that a number of quite large polluted water sources need to be cleaned before the water can be either disposed to the environment or reused. The volumes of water and their pollutant loadings are such as to make filters unsuitable for all but the most lightly polluted water sources. Chemical dosing with large settling ponds is a possibility for smaller volumes of water, where reasonably sized ponds are acceptable to store the water over a few days. Chemical dosing adds to the salinity of the water and salinity of many water tables is already a significant problem. Using dissolved air flotation (DAF) systems is another possibility, but their costs are high and they require chemicals. Electrolytic water treatment systems offer the possibility to treat large volumes of water without the disadvantages of the other two systems.

Electroflocculation, one of the electrolytic water treatment techniques, involve the passage of an electric current between two electrodes, at least one of which is a metal that gives off flocculating ions, either $Al^{+++}$ or $Fe^{+++}$ when used as an anode. These metal ions adhere to pollutants in the water, flocculating them. Cathode reactions include the generation of $H_2$ gas micro bubbles. If the system is arranged correctly, these gas micro bubbles capture the flocculated particles and float them up to the surface, from where they can be easily removed.

This process has been successfully employed for small volumes of water at rest in closed containers. In this technique, water is pumped into a container, treated, allowed to rest while the remaining pollutants and gas bubbles float to the surface and then pumped out. It is not suitable for large volumes of water because of the times to pump the water into the container and pump it out again. As the volumes get larger, the time to pump the water in and out of large containers makes the process less viable.

There are many situations where it is desired to treat large volumes of water per day. Some electrolysis based water treatment systems have been developed that can dose mega liters of water per day with metal ions. Most of these involve the use of filters to remove the pollutants after they have reacted with the metal ions. This poses serious problems if the water is heavily polluted or contains substances such as oil that can foul filters. Some involve the use of open containers with plates such that the water flows through and is flocculated. However there the objective is flocculating the pollutants, with pollutant removal still occurring by using filters or settling tanks. Still others use closed containers with the flocculated particles and bubbles in the water being carried through to the separation phase (either filters or settling). These all have a number of disadvantages as far as operating efficiency is concerned These problems can be overcome in a system that enables the water to flow continuously while the pollutants are floated to the surface and removed. It is the objective of the apparatus described in this application to demonstrate a mechanism by which the bubbles generated by the electrolytic process can be used directly to capture the pollutant particles flocculated by the Al and/or Fe metal ions, float them to the surface where they remain, to be removed without the need for any additional foaming or floc capture chemicals, or using a filter to remove them. It should be noted that this process is scaleable in size and the same criterion can apply for small and large sized systems.

SUMMARY

According to a first aspect of the invention, there is provided an apparatus for removing pollutants from water, the apparatus comprising:
  a container having a water inlet for the water to flow into the container and a water outlet for the water to flow out of the container;
  a plurality of electrodes and a regulated supply arranged to apply an electric potential to the plurality of electrodes to generate flocculating metal ions for removal of the pollutants from the water;
  a controller arranged to monitor and control the regulated supply, the controller being further arranged to adjust the rate at which water flows through the water inlet to match a current passing through the water when the electric potential is so applied to provide the water being treated with a predetermined charge dose.

An embodiment comprises another container having another water inlet that receives water from the container, the other container having at least another plurality of electrodes and another regulated power supply arranged to apply another electric potential to the other plurality of electrodes, wherein the controller is arranged to determine when one of the regulated power supply and the other regulated power supply is unable to provide a preset current and in response matching a percentage reduction in the current of the one of the regulated power supply or the other regulated power supply with the other, and adjust the rate at which water flows through the water inlet, to provide the water being treated with a predetermined charge dose.

In an embodiment, the controller is arranged to monitor the current passed through the plurality of electrodes and the other plurality of electrodes and the rate at which the water flows through the container and adjust the current passed through the plurality of electrodes and other plurality of electrodes such that the charge dose delivered to a volume of water by each of the plurality of electrodes and the other plurality of electrodes is the same.

In an embodiment, the plurality of electrodes comprises an anode comprising steel and the other plurality of electrodes comprises an anode comprising aluminum.

In an embodiment, the water from the other container is received by a further container that has an outlet configured to have an adjustable height.

An embodiment is arranged to adjust the rate at which water flows through the water inlet such that a substantial portion of a floc having at least some the flocculating metal ions and at least some of the pollutants accumulate on the surface for subsequent removal.

In an embodiment, the regulated power supply is a controlled constant current power supply.

In an embodiment, the controller is arranged to cause a charge density provided by the plurality of electrodes to be less than 300 amps per square meter.

In an embodiment, the controller is arranged to cause a charge density provided by the plurality of electrodes to be less than 1000 amps per square meter.

In an embodiment, the container comprises a substantially open top container.

According to a second aspect of the invention there is provided a method for removing pollutants from water, the method comprising the steps of:

flowing the water through a container;
generating flocculating metal ions for removal of the pollutants from the water by a regulated power supply applying an electric potential to a plurality of electrodes in the container;
monitoring and controlling the regulated supply;
adjusting the rate at which water flows through the water inlet to match a current passing through the water when the electric potential is so applied to provide the water being treated with a predetermined charge dose.

An embodiment comprises flowing the water through another container having another regulated power supply applying another electric potential to at least another plurality of electrodes in the other container, the controller determining when a predetermined current can not be provided to one of the plurality of electrodes and other plurality of electrodes and in response matching a percentage reduction in the current of the one of the regulated power supply or the other regulated power supply with the other, and adjusting the rate at which water flows through the water inlet, to provide the water being treated with a predetermined charge dose.

An embodiment comprises the steps of monitoring the current passed through the plurality of electrodes and the other plurality of electrodes and the rate at which the water flows through the container and adjusting the current passed through the plurality of electrodes and other plurality of electrodes such that the charge dose delivered to a volume of water by each of the plurality of electrodes and the other plurality of electrodes is the same.

An embodiment comprises the step of water from the other container being received by a further container and adjusting the height of an outlet of the further container.

In an embodiment, the plurality of electrodes comprises an anode comprising steel and the other plurality of electrodes comprises an anode comprising aluminum.

In an embodiment, the step of adjusting the rate at which water flows through the water inlet such that a substantial portion of a floc having at least some the flocculating metal ions and at least some of the pollutants accumulate on the surface for subsequent removal.

In an embodiment, the regulated power supply is a controlled constant current power supply.

An embodiment comprises the step of the plurality of electrodes providing a charge density of less than 300 amps per square meter.

An embodiment comprises the step of the plurality of electrodes providing a charge density of less than 1000 amps per square meter.

In an embodiment, the container comprises a substantially open top container.

In an embodiment, generating flocculating metal ions comprises the step of generating at least one of iron ions or aluminum ions.

BRIEF DESCRIPTION OF THE FIGURES

Embodiments will now be described by way of example only with reference to the accompanying figures in which:

FIG. 1 shows an embodiment of an apparatus.
FIG. 2 shows an oblique end elevation view of the apparatus of FIG. 1.
FIG. 3 shows a side elevation view of the apparatus of FIG. 1.
FIG. 4 shows a side sectional view of an example arrangement of electrically active plates within the apparatus of FIGS. 1 and 2.
FIG. 9 is an oblique sectional composite view of the apparatus of FIG. 7.
FIG. 10 is a detail of the role of example partitions/barriers in directing water flow to reduce floc passage from one chamber to the next.
FIG. 11 is an illustration of an example of a controlled water level mechanism.
FIG. 12 is an illustration of an example mechanism of generating a wave to remove the floc from the container.

OPERATION OF EMBODIMENTS

Figure 5:
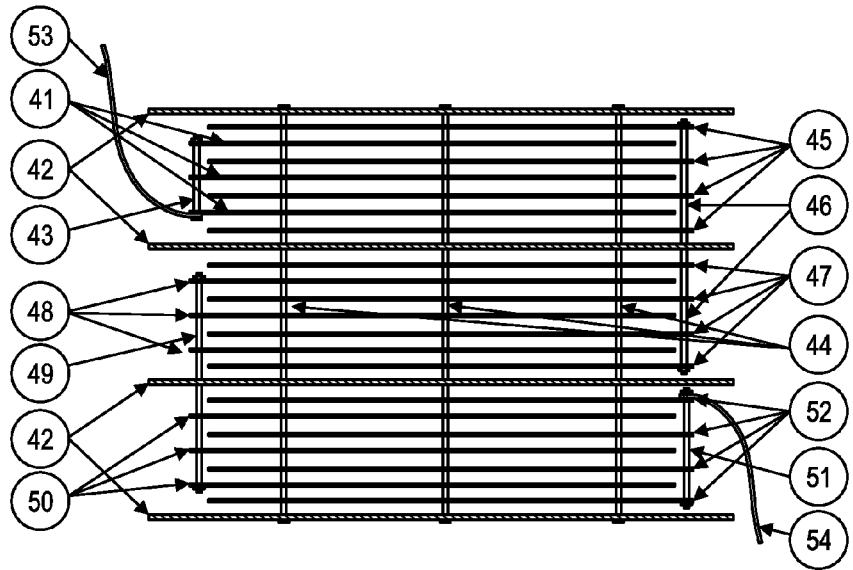
FIG. 5 is a plan view of example plate sets that may be activated by connecting them to an electric power supply.

The main process in the treatment of water by electroflocculation is the passage of an electric current between metal plates immersed in water, across which an electric potential has been applied. Such a current will liberate ions at the plates, according to the following reactions.

Anode $$Fe-3e\text{-}\rightarrow Fe^{+++} \tag{1}$$

$$Al-3e\text{-}\rightarrow Al^{+++} \tag{2}$$

$$2H_2O-4e\text{-}\rightarrow O_2+4H^+ \tag{3}$$

Cathode $$2H_2O+2e\text{-}\rightarrow H_2+2OH- \tag{4}$$

These reactions generate the flocculating metal ions $Al^{+++}$ and $Fe^{+++}$, as well as gas bubbles, both $H_2$ and $O_2$. As such this process has the theoretical capability to generate requirements for the flocculation process to capture the pollutant particles and the gas bubbles to float them to the surface. It remains necessary to demonstrate the circumstances under which this could occur in practical manner.

The Al and Fe metal ions go into solution at almost the same rate at which the gas molecules are produced. They can be produced in the same region if the electrodes are large plates placed approximately vertically in the water with the separation distance much less than the height and width of the plates. Experience has shown that the most efficient method of getting the electroflocculation reaction to occur is by having a low voltage applied across large area plates. The passage of an electric current between electrodes is approximately proportional ohms law, namely $$I\approx(V-e)/R, V>e \tag{5a}$$

$$I\approx 0, V<e \tag{5b}$$

where I is the current that passes between the electrodes with a voltage V applied across them, e is the surface work function or electric potential required to generate the ions and R is the effective resistance. For water of a given conductivity, R is approximately linearly proportional to the area of the electrodes and inversely proportional to the electrode separation distance. As such, it is important to have the electrodes parallel to each other with a large surface area in such a manner as to provide the minimum resistance to the passage of electric current between the plates. As can be seen from equation 5a, once there is sufficient voltage available, an electric current will pass through the water. This will give rise to the reactions 1 through to 4, in an almost linear response above the minimum voltage.

Once the passage of current starts, the voltage applied determines the rate at which the reaction occurs for a given plate area and water conductivity. In order to get the gas bubbles to efficiently capture the pollutants and float them to the surface, the gas bubbles must not be too large. These bubbles are produced at the time the electric current passes from the plates to the water. If the density of the electric current is low, less than approximately 300 amps per sq m, the gas bubbles are released from the plate before they have a chance to grow too large, essentially staying as what is called micro bubbles. The micro bubbles efficiently capture the pollutants that have been captured by the flocculating Al and Fe metal ions and float them to the surface. In particular, this process is most efficient with aluminium ions. As such, the use of a low current density for the application of a voltage across plates in polluted water is particularly useful to get the correct combination of aluminium metal ions and micro bubbles to get the captured pollutants to stay on the surface. It is more useful for aluminium than iron because aluminium is a lighter metal than iron and as such is more likely to stay on the surface when supported by gas bubbles.

As the current density increases, that is the voltage increases for a given plate area, or the conductivity of the water increases, the bubbles grow at a faster rate and consequently grow larger before they detach from the plates. The larger bubbles move faster up through the water. This has two effects. First some of the bubbles do not stay at the surface when they reach it. They reach the surface and break or "bounce" off, going back into the water and taking the pollutants attached to them with them. The larger bubbles also mean that the floc that forms is not as stable. This occurs because the finer are the bubbles that form in the floc, the more stable is the floc. The coarser the bubbles, the less stable is the floc. Second the larger bubbles move up faster, dragging the water with them to produce significant turbulence in the water. This turbulence drags the flocculated pollutants around, stirring up the water and not allowing the flocculated pollutants to settle to the surface, causing many to sink to the bottom of the vessel. There, removal is much more difficult than if they remain on the surface. Therefore it is important that the density of the electric current be selected so that the bubbles are formed at the size appropriate for the reaction to produce a stable floc that remains on the surface, from where it can be easily removed.

This is easily done when the current density is low, of the order of 100 amps per sq m. This is relatively easily achieved when it is desired to treat small volumes of water in large containers. However it places limitations on the process when it is desired to treat large volumes of water in a rapid and efficient manner. If the current density is too low, the reaction will occur, but insufficient volumes of water will be treated for the size and cost of the equipment, as to make it too capital intensive to be considered for many applications. Current densities of greater than approximately 1000 amps per sq m are too fast for adequate micro bubble formation. At such a level, the current density is too high and the bubbles will be too large for a stable floc layer to form on the surface. The ability to treat the water with the correct current density under the correct circumstances offers a significant advantage in the electrolytic treatment of polluted waters. It is the achievement of this for which the device described herein is designed.

To achieve the desired outcome of treating the water at a rapid rate in such a manner that the pollutants float to the surface from where they are removed, it is essential that the water flows continuously through the water treatment system in such a manner that it does not carry the floc with it as it flows through the system. This is determined by using a sufficiently large volume for the flow rate, ie, matching the flow rate to the volume and current density.

To get the system to float the pollutants to the surface in a continuous flow process, the first requirement is for an open top container. If the container does not have an open top in a continuous flow system, it is difficult to remove the floating floc. It would be appreciated by anyone skilled in the art that an open top is one that is exposed to atmospheric pressure and may include a closed top that keeps out the weather, and which posses an outlet from which the removed floc can escape.

Observations show that the passage of an electric current through water, which gives rise to the gas bubbles, results in the gas bubbles rising and taking the surrounding water with them. In turn, this results in the water above the electrodes rising through the container, the rate of that rise being approximately proportional to the amount of gas generated. In any event, the water will rise at the rate of a few cm per second, depending upon the activity. The system should be developed such that the flow of water into the system is below the electrodes. In that manner the upward flow of water through the system will work with the upward flow of water generated by the gas bubbles, making the process more efficient.

Having treated the water with the correct current density and flow rate, the flocculated particles will rise to the surface and stay there. For maximum efficiency, the water must then exit the container in such a way that it prevents the floc from flowing out with the water. This is best achieved by making sure that all the water rises to the top before it exits the container, giving the floc the best opportunity to reach the top. Then steps must be taken to make sure the water doesn't take the floc with it when it exists the container. This can be achieved by making the floc flow over a partition or wall near the end of the container, with a restraining barrier somewhat above the wall that prevents the floc from reaching the water beyond the wall. For best results the water should always have a laminar flow, so that there is no turbulence to pull the floc with it. This requires the height of the wall to be a compromise between being sufficiently high that the water has to reach the surface before flowing over it and sufficiently low that the water flows over it in a laminar manner.

It will be obvious to anyone skilled in the art that the floc will simply accumulate on the surface of the container and will need to be removed. There are many methods by which floc can be removed and some of these are presented in the description of the apparatus.

The two best metals for electrofocculation are iron and aluminium. It is apparent that, while both remove pollutants, they have different efficiencies for different pollutants. In particular, iron is good at breaking down emulsified oils, as well as capturing a number of iron insoluble chemicals such as arsenate and cyanide, changing the equilibrium of some pollutants and removing an array of smaller organic molecules. Unfortunately iron also sends the water a rusty red colour if too much is dosed into the water. Aluminium is good for removing suspended solids and in producing the stable floc so necessary for the pollutant removal in this one step process. As such it is often advantageous to have the water pass through at least two stages of treatment to remove the suspended or dissolved pollutants.

DETAILED DESCRIPTION OF EMBODIMENTS

An important aspect of this process is that the water to be treated is given the correct treatment dose for each unit volume of water to be treated. That is, if the water required a dose of 100 coulombs of electricity per liter of water to be treated, it is important that 100 coulombs of electricity pass through the system for each liter of water that passes through the system. There are several conditions under which this can be achieved:

1. Pass the electric charge through the water at a constant rate and pump the water through the system at a constant rate such the rate of passage of electric charge equals the rate of passage of water multiplied by the coulombs per unit volume of water required for adequate treatment of that type of water.
2. Pass the electric charge through the water using a mechanism such that the rate of passage of electric current controls the rate at which the water is pumped through the system, in a manner that the coulombs passed through the water equals the desired coulombs per unit volume for the water to be treated.
3. Pass the water through the system using a mechanism such that the rate of passage of water controls the rate at which the electric charge is passed through the system, such that the coulombs passed through the water equals the desired coulombs per unit volume for the water to be treated.

These could be used independently or in conjunction with either of the other two, in such a manner that the coulombs passed per volume of water is maintained at a relatively constant level, which level could vary by few percent without greatly affecting the integrity of the process. This involves the use of a known water flow rate and a known rate of charge dosing. Ideally this is best achieved with a constant flow rate and constant current power supply.

There are several different methods of obtaining a constant flow rate of water. The apparatus requires the use of a raw water source which has some control or limitation such that water can enter the system at a known or controlled rate.

FIG. 1 illustrates one mechanism by which the constant flow of water can be known and maintained. In this illustration, the raw water supply 1 is connected to the system inflow 8 via the pipe 3, which pipe includes the optional service valves 9, installed for easy servicing. The pump 10 is a normal constant flow pump. Once it is turned on, water flows through the flow meter 2, which sends a signal to the controller 6, via the connection 7. The controller 6 is programmed to deliver a constant flow of water to 8. If the controller 6 senses that the flow through the flowmeter 2 is too low, it sends a signal via connection 5 to the restriction valve 11 causing the restriction valve to open its restriction a little wider and allow more water to flow. In the same manner, if the controller 6 senses that the flow through the flowmeter 2 is too high, it sends a signal via connection 5 to the restriction valve 11, causing the restriction valve to close its restriction a little narrower and cause less water to flow. For safety purposes the raw water supply could include a level switch 12 which shuts the pump down when there is no longer any water available to treat. It also sends a signal to the controller 6 to stop the system from further processing the water.

For this continuous flow technique to work, the water must flow into a container that has a set of metal plates that can be activated as indicated above. This will cause the water to flow through the system with the majority of the pollutants being captured and floated to the surface where they will form a stable layer. Embodiments may provide a mechanism that separates the captured pollutants from the treated water, allows the treated water to flow out and the captured pollutants to be retained and removed separately. One embodiment of this is shown in FIGS. 2, 3 and 4.

The apparatus requires at least one open top container 22 to be mounted substantially horizontal, which container has a water inlet 24 substantially at one end and a water outlet 26 at any convenient position substantially at another end of the tank, preferably substantially opposite the inlet 24. Preferably it has a sloping bottom 23, and at least one outlet 28 at the bottom, connected to a drain 29, from which the water can be drained if and/or when it is required for servicing or other tasks. The drain 29 has a valve 27 that can be opened when required to drain settled material from the bottom when its buildup gets too high, but otherwise remains closed during operation. The bottom 23 can either be flat or sloping. If sloping, the bottom 23 can be in three dimensions, instead of just the two dimensions illustrated and can be of any reasonable angle that does not make the apparatus too tall, with 45° being preferable. Angles of approximately 15°, 30° and 60° could be considered adequate. The container could include a partition 25 close to the outlet end of the container, which partition extends from the bottom of the container to below the lowest upper level 21 of the container. The design should be such that the water flows in at the inlet end, through the volume of the container and over the partition 25 at the outlet end before it flows out the outlet. The operating process will build up floc at the top of the water and a barrier 32 can be placed before the overflow edge so as to prevent much of the surface floc from flowing out with the water.

In practice, a plate set 31, see FIG. 4, is placed in the container 22. When activated by applying a DC or rectified AC voltage it will generate bubbles and flocculating metal ions in the water. The bubbles will circulate the water within the container 22 and carry flocculated pollutants to the surface. To limit the floc and bubbles flowing over the wall 25, it is desired to have a barrier 32 that causes the water that flows over the wall 25 to be collected from a region below the surface level of the water at which the bubbles and pollutants accumulate as a floc. Some will still flow up between partition 32 and wall 25, but these will only be a small fraction of the floc that is accumulated within the remainder of the chamber. It should be pointed out that the floc is sufficiently stable that once reaching the surface it will not flow out of the container if the water level is somewhat above the top of partition 25. In this case the walls of the container 21 and the position of the outlet 26 are sufficient to separate the floc and water.

The apparatus is operated such that the water level is maintained at or just below the lowest wall 21. The means of maintaining this is illustrated later, not in these figures. When sufficient floc has accumulated on the surface of the water, it can be removed. There are many mechanisms of removing the floating surface floc and some are discussed later. It is desirable that the lowest wall be substantially horizontal so that the floc is removed uniformly from over the surface.

The relative dimensions of the container are not critical. It can be approximately cubic in shape, as illustrated in FIGS. 2 and 3. It may be long, wide or tall. It may be cylindrical, oval shaped, circular or any other geometry. Preferably the inlet and outlet will be substantially opposite each other and there are advantages in having the length and/or height longer and/or taller than the width, but this is not critical. Other partitions and/or barriers, separate from partition 25 and barrier 32, can be used achieve similar or improved results. The important feature here is that some form of partition is used to restrict the flow of the floc out with the treated water. As mentioned in the background, these systems can be constructed and operated at any size that is convenient to handle. This can include systems in which the container dimensions are typically 0.3 m or smaller, 1.0 m or smaller, 3.0 m or smaller, 10.0 m and smaller, 30 m and smaller, 100 m and smaller or greater than 100 m. The principles are the same, the systems are able to be scaled to suit these dimensions.

An example of a set of metal plates, 31, inserted in the apparatus container is illustrated in FIG. 4. These substantially parallel plates need to be supported somewhat above the bottom of the container, such as to allow the water to enter at a level below the bottom of the plates. It should be noted that during operation the bubbles generated from reactions 3) and 4) will cause the water to rise through the plate set. When operated correctly this will circulate the water several times during its passage time through the apparatus and as such, it is not necessary to have the water inlet 24 below the bottom of the plate set 31. The reaction itself ensures the water passes through the plates even if the inlet is above plates. However for efficiency purposes it is desirable to have the water inlet 24 somewhere near the bottom of the plate set 31. In operation the water 61 flows in through the inlet 24 and is circulated through the activated plate set 31. This causes floc 62 to accumulate on the surface of the water at the lowest level edge. The barrier 32 and partition 25 restrict the floc from flowing out with the water as it exits the container via the outlet 26. In this manner much of the pollutant is captured as a floc on the surface of the container, from where it can be removed over edge 21. The mechanism is discussed later.

In order for the system to work, at least two of the plates in the plate set 31 need to be electrically connected to a power supply. This connection may be either directly from a power supply or via a connection to a plate or plates placed between plates of opposite polarity, such that when a voltage is applied to the external plates, the passage of current between the external plates causes intermediate plates to have a voltage intermediate between the voltage of the external plates. One example of this is shown in FIG. 5.

Several sets of parallel metal plates, 41, 45, 47, 48, 50 and 52 are held in position by a series of insulated spacers 44, with the total assembly supported by a stand 42. The plates 41 are electrically connected to each other by a connection 43, to which is attached an electrical lead 53. Such an assembly constitutes one electrode, say the anode. Interspersed between and/or surrounding plates 41 are another series of plates 45, which are connected via an electrical connection assembly 46. This acts as a cathode to the plates 41. In turn, the connection assembly 46 connects plates 45 to plates 47. Interspersed between and or surrounding plates 47 is another set of plates 48. In their turn, plates 48 are held together by the connection assembly 49, which also electrically connects plates 48 to the set of plates 50. Interspersed between and or surrounding plates 50 is another set of plates 52, which is held together by an electrical connection assembly 51 and to which is attached electrical lead 54. This results in plates 52 acting as the cathode to the assembly. It is apparent that the number of these joining sets of plates can be increased or decreased as required and three interconnecting sets as illustrated is one possibility. Other possibilities include only one interconnecting set, two interconnecting sets, four or more interconnecting sets.

It is apparent that if the water is highly conductive, the path of least resistance for the electric charge to flow from the anode to the cathode is via the water rather than through the neutral electrode sets. To overcome this, it is desirable to have insulating barriers 42 between the interconnected plate sets. These barriers need to be of a sufficient area to limit the ability of the charged particles to flow around the barrier, thus making the easiest path of current flow to be between the interconnecting plate sets.

In operation, the whole plate set is immersed in water, which the presence of ions makes electrically conductive. The application of a positive voltage to the lead 53 and a negative voltage to the lead 54 results in the passage of ions from plates 41 to plates 52. This occurs in a series of steps, with ions first going from plates 41 to plates 45, taking electric charge and hence imparting a voltage to plates 45. In turn plates 45 are connected to plates 47, giving plates 47 the same voltage as plates 45. In the same manner, plates 47 are interspersed and/or surrounded by plates 48, causing a passage of ions between those sets of plates. In a similar manner plates 50 are connected to plates 48 via electrical connection 49. Plates 50 are interspersed between and/or surrounded by plates 52, which in this example are the cathode. This causes ions to flow between plates 50 and 52, taking the charge from the anode 41 to the cathode 52, completing the circuit.

This results in the passage of an electric current between plates 41 and plates 52, such that plates 41 have a full positive voltage, plates 45 and 47 have the same first intermediate voltage, plates 48 and 50 have the same second intermediate voltage, while plates 52 have the full negative voltage. As an example if the voltage applied at lead 53 is +V volts and the voltage applied to lead 54 is 0 V, the voltage on plates 41 will be +V, that on plates 45 and 47 will be an intermediate voltage of approximately +⅔ V, while that on plates 48 and 50 will be approximately +⅓ V and the voltage on plates 52 will be 0 V. Plates 41 will act as the anode to plates 45, which will act as the cathode to plates 41. In turn plates 47, which are electrically connected to plates 45, will act as the anode to plates 48, which will act as the cathode to plates 45. In turn plates 50, which are connected to plates 45, will act as the anode to plates 52, which is the cathode. In this manner an electrical current will pass from the anode 41 to the cathode 62. In so doing the current will pass three times between an anode and cathode. This means that each unit of electric current releases three units of reaction, making the process more efficient in its use of electric current.

It should be noted that the electrical conductivity of the water means that the ions can pass from the higher potential plates to the lower potential plates through the water, and not just between the plates. In particular it is possible for ions from plates 41 to move through the water directly to plates 52, rather than having the ions pass directly from plates 41 to 45/47 and then to plates 48/50 and finally on to plates 52. To reduce the possibility of this, insulators can be inserted between the plate sets, which insulators extend well beyond the physical limits of the plate sets. In the situation shown in FIG. 5, the supports 42 are also the insulators and are shown extended beyond the limits of the plates. The supports and insulators may be separate entities. This significantly increases the distance the ions need to flow to jump across the electrodes, minimizing the jumping effect.

There are many shapes and forms in which the metal plates can be assembled. The format is not important other than that it enables the passage of an electric current between metal plates to generate flocculating metal ions and gas bubbles.

FIG. 4 shows an example of a set of plates 31 inserted into the container 22. Water 61 flows in through the inlet 24 at the bottom of the container 22 and passes up through the plate sets 31, across which an electrical potential has been applied. This causes the reactions in equations 1 through 4 to happen, generating the flocculating Al and or Fe ions, depending upon the metals used in the plate sets. These flocculating ions capture the pollutants in the water, generally making them grow larger. At the same time, the gas bubbles released through reactions 3 and 4 will capture these flocculated pollutant particles and float them towards the surface. Provided the voltage applied across the electrodes results in a charge density of less than 2000 coulombs per second per square meter, the bubbles will generally be sufficiently small that the motion they generate will not greatly disturb the flow of the water and the bubbles carrying the flocculated pollutants will adhere to the surface, generating a floc 62.

There are different methods available to remove surface floc from water. Some of these will be discussed later. The important feature is that there is some mechanism available that allows the floc to be removed during the process of removing the pollutants from the water. In this method, a single container can be used to separate the pollutants from the water, in which the water flows in at one end, the pollutants float to the surface and the treated water is drawn out from near the bottom of the container. In this manner, the container acts in the same manner as a filter, with the exceptions that the pollutants are floated to the surface instead of being removed by being captured by the filter mechanism and clogging up. This provides a significant advantage over other electroflocclation or electrocoagulation techniques in which the process either flocculates the pollutants and they are removed by filters, or in which a batch process is used to separate the floc.

Figure 6:
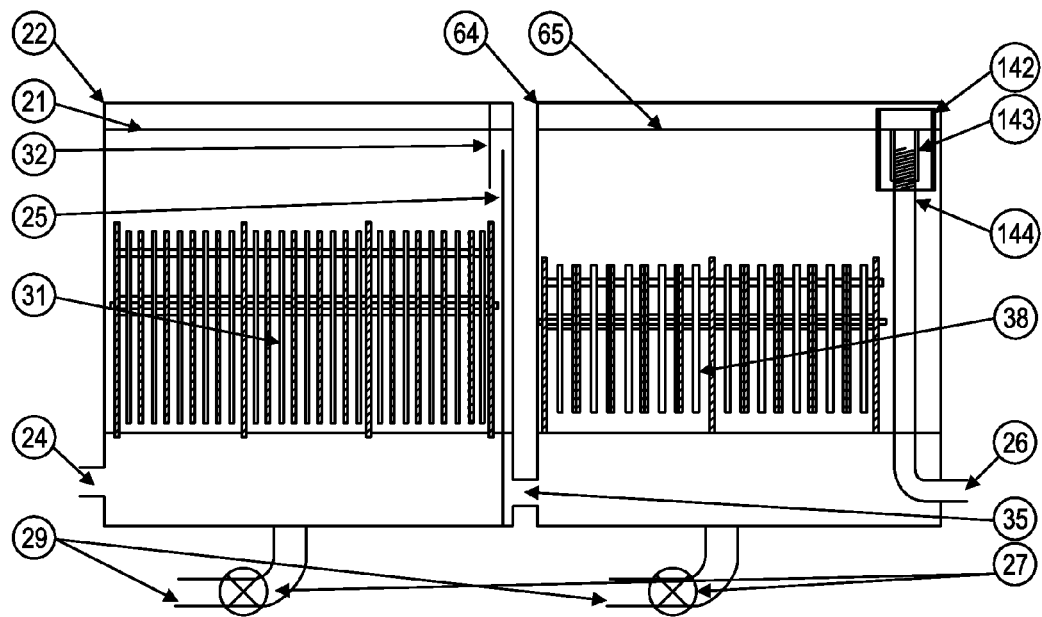
FIG. 6 is a sectional view of an embodiment of a dual container facility operating in series, including electrodes.

It is usually not possible to remove all the pollutants or adequately treat the water by passing it through a single container apparatus, or by using just one type of metal plate set. Experience indicates it is best to pass it through at least two containers, with or without different metal plates in each container. This can be achieved in an apparatus in which the inlet of a second container having similar properties to the first is attached to the outlet of the first container, as illustrated in FIG. 6. In this double container system, water enters the first chamber through its entry orifice 24, flows through the plates and past the partitions to exit that chamber at the entry to the second chamber 64, via the connection 35. Container 64 may contain a second plate set 38.

Experience has shown that the Fe and Al metals ions are capable of removing different pollutants. As such it is often desired to have both metals available to treat the water. Because the aluminium is capable of removing the Fe ions, it is, in a continuous flow mechanism, best to have the two metal plate sets in different containers, with the iron plate set positioned before the aluminium plate set. Failing that, they could be in one container at least separated from each other such that most of the water must substantially flow through the iron electrodes before flowing through the aluminium electrodes. It is particularly advantageous to have the iron electrodes first, followed by the aluminium electrodes in a separate container. One method of achieving this is join two containers in series, as illustrated in FIG. 6.

The water enters the first container 22 through the inlet 24 and passes through the activated electrodes and over the wall 25, passing into the second container 64 through a flange or similar connection 35. In the second container 64, which does not necessarily need to have the same configurations as the first container 22, the process is repeated with the water passing out the outlet orifice 26. There are many ways of employing a barrier system to keep the floc from flowing out with the water. The second chamber in FIG. 6 shows another means, illustrated by items 142, 143 and 144, which are connected to the outlet 26. A threaded pipe 144 is connected to the outlet 26. Fitting over or into the threaded pipe 144 is a threaded cylinder 143, of substantially the same internal diameter as the threaded pipe 144. Attached to that threaded cylinder is a barrier 142 that extends sufficiently above the top of the threaded cylinder to prevent the surface floc from flowing over it. The barrier 142 may also extend below the threaded cylinder 143. In operation the threaded cylinder and barrier assembly 142/143 is screwed into the threaded pipe until it is just below the top of the lowest edge 141 of container 64. In this manner the treated water can flow over the top of the threaded cylinder 143, down pipe 144 and exit the apparatus through the outlet 26. By rotating the assembly 142/143 it is possible to set the level of the water very precisely to be just below the level of the overflow side 65. This makes removal of the surface floc much easier.

Containers 22 and 64 should be set such that the levels of the floc removal lowest sides, 21 and 65, should be at the same horizontal level. In this manner, the adjustment of the mechanism 142/143 sets the level of water for both the containers, making floc removal easier. If this is not done, then each container needs an outlet like items 142, 143 and 144 in FIGS. 5 and 6, with successive containers at a lower level than the first container. In that manner the level of the water in each container can be controlled to be just below the level of the lowest edge for each container.

This process of joining containers in this manner may be repeated as many times as required. From a practical point of view, it may be desired to have the containers the same size, while at the same time using significantly different treatment doses for the water during the iron process than during the aluminium process. For example there are many processes in which the water may need only about 10% the iron dosage compared to the aluminium dosage. Although this could be achieved by having a single container for the iron and another larger single container for the aluminium, there are advantages in keeping the size of the containers the same and increasing the number of aluminium tanks. One of these advantages is that floc removal is more efficient if the floc is kept in a smaller container, with less surface distance for it to flow to be removed from the system. For the same reason, taller containers with their smaller surface area are preferable to squatter containers that have a larger surface area for the same volume of water.

Figure 7:
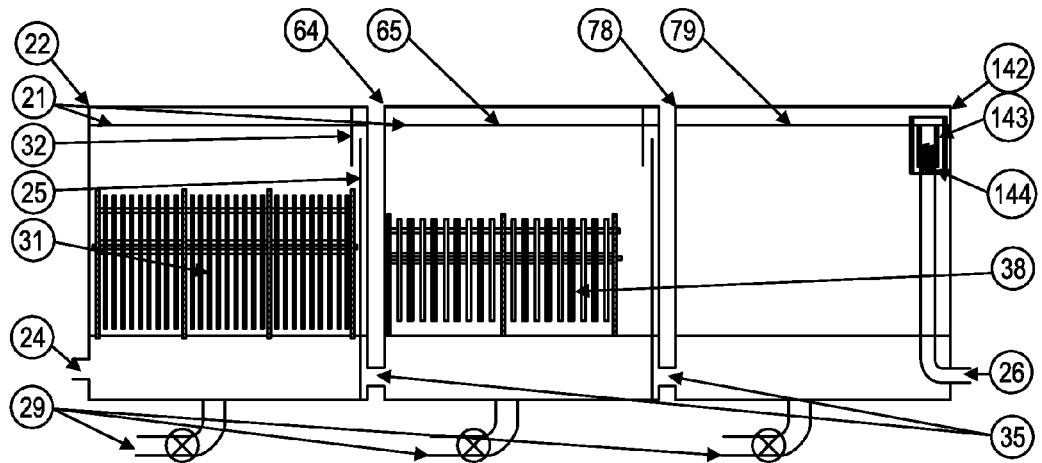
FIG. 7 is a sectional view of an embodiment of a three container system, with the second container used for electrodes and the third container used as a rest container.

It is apparent the number of containers can be increased well beyond the two indicated in FIG. 6. Preferably each separate container could be used for a set of plates composed of the one type. It is also possible that the residence time of the water in the container is not sufficient to allow all the bubbles, which carry the flocculated pollutants with them, to rise to the surface. In this case, additional resting can be achieved by passing the water through another container, which could likewise be similar to the assembly shown in FIGS. 2 and 3, or container 78 in FIG. 7. During the water's residence time in this sewing container, much of the residual floc would float to the surface, allowing the water that flows out the final outlet 26 to have less residual pollutants. It is obvious to those skilled in the art that further rest chambers can be placed at the end of the one shown in FIG. 6. Experience shows that the process of generating sufficient metal ions and gas bubbles to treat the water can be done quite rapidly. However there is a minimum time required to achieve good removal and floc accumulation on the surface. The time varies between a few minutes to a few hours depending upon the desired end result. As such multiple additional rest chambers can be employed, with one, two, three, four or even five or more being advantageous. Also it is apparent that the water can be sent to another container after this treatment in order to let the water rest externally. During that period the water will settle out and the final pollutants will be removed. Times of over 12 hours are often required to produce the best settlement.

Figure 8:
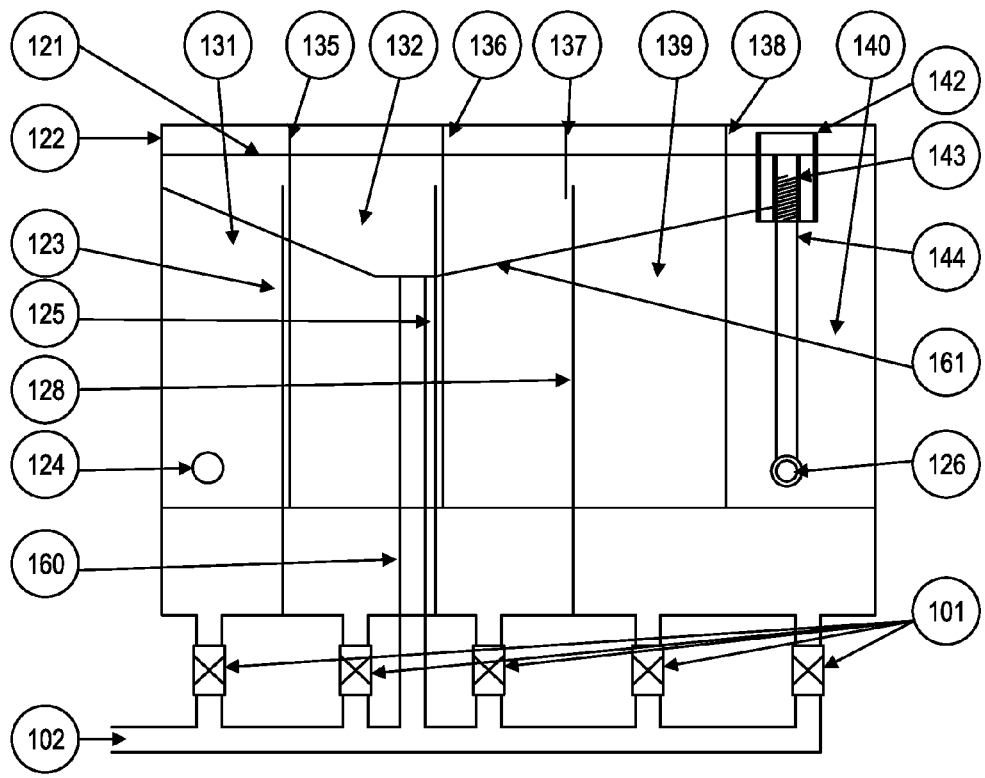
FIG. 8 is a sectional composite view of an example single container separated into multiple compartments.

In another embodiment of the device, a single container is used, as illustrated in FIGS. 8, 9 and 10. The sides and bottom define a single open topped container 122, which has an inlet 124 substantially at one end and an outlet 126 substantially at the other end. The container is divided into separate chambers, using partitions 123, 125 and 128 as illustrated. These extend from the bottom, substantially making water tight seal that extends nearly to the lowest side edge 121. These define individual chambers. One or more metal plate sets, shown only in FIG. 10, can be placed into one or more of these chambers. Typically two plate sets can be used, one each in the first two chambers 131 and 132. Barriers 135, 136, 137 and 138 separate the single container into 5 compartments at the surface. The barriers 135, 136, 137 and 138 prevent the floc from flowing from one compartment to the next. Each of the compartments has a valve 101 at the base, which valve can be opened periodically as required to drain water and settled pollutant slurry when the buildup becomes too great for efficient operation. The advantage of the sloping bottom is that the slurry will travel out with the water. During operation the valves 101 will normally be closed.

FIG. 10 illustrates the water flow through such a system. Water flows in at the inlet 124 and is acted upon by the activated plate set 141. The generated bubbles cause the water to circulate through the chamber 131 at a rate that will generally cause the water to circulate more than once during its time in the chamber. This makes sure that most of the water passes through the activated plates and all of it is exposed to the reaction. Water then flows over, partition 123 and down between it and barrier 135, to enter the second chamber near the bottom of the activated electrodes 145. The water will circulate more than once during its time of passage in the chamber, before flowing over partition 125 and down between 125 and barrier 136. It should be noted that barriers 135 and 138 do not need to extend all the way down to the bottom of the electrodes. When a chamber has an activated plate set, the water circulates, treating the water wherever it enters. Obviously those barriers 135 and 136 need to be sufficiently low that the water cannot flow directly across the top of the chambers and take the floc with it.

In FIGS. 8, 9 and 10, the remaining chamber 130 and compartments, 139 and 140, are rest volumes where there are not necessarily any active plates. These are intended that the water simply flows in a laminar flow into the third compartment, over the partition 128 into the fourth chamber and compartment 139. There the water flows through it, under barrier 138 into the fifth compartment 140. In operation the flow rate should be set such that the great majority of the floc is collected in the first four compartments, leaving only a small amount flowing into the fifth compartment. During this process, the floc and bubbles get close to the surface where most stay. Those that continue from one compartment to the next are mostly caught in the next compartment. In this manner the floc removal is greatly increased over that of just a single chamber container as illustrated in FIGS. 2, 3 and 4. The water flows out the fifth compartment via the adjustable level assembly 142, 143 and 144, which should be adjusted so that the water level at all compartments is just below the overflow edge 121.

Preferably the container should include a floc capture drain 161 outside it below the lowest edge. In this manner, when the floc is forced over the edge, it drops down into the capture drain and flows under gravity to a floc capture container. From there it can be treated or disposed of in any manner deemed suitable. Within the water treatment industry, there are several ways of removing floc from the surface of water. In dissolved air flotation (DAF) this is usually done by scraping the floc over an edge out of the container. Other methods include skimming the surface water so that the flowing water drags the surface material with it. The preferred method is to generate a wave at the side of the compartment away from the overflow edge. This wave action will send a wave of water carrying the floc over the edge. One suitable mechanism is shown in FIG. 11. In FIG. 12, the waves are generated by a paddle, 168, which is approximately horizontal and moved up and down by a motor 162. The motor rotates turning a cylinder 163 to which a connecting rod 164 is flexibly attached at one end. At the other end it is flexibly attached to a bar 165. In turn the bar is connected to rods 166, which slide through guides 167 and to the bottom end of which is attached the paddle 168. As the motor rotates, the paddle moves up and down, generating a wave at the side of the container or compartment away from the edge. This forces the floc 170 towards the edge 121 and results in some of the floc and some water splashing over the edge into the floc capture drain. From there it flows down the pipe 160, from where it may be directed in any suitable method for collection and/or disposal. In the illustration in FIG. 8, it is connected to the waste disposal pipe 102 which collects the waste drained from the bottom of the compartments via the valves 101.

It should be noted that the same device can be used for the single chamber containers illustrated in FIGS. 2, 3 and 4, and that each of the containers in FIGS. 5 and 6 can also have its own wave generating device. The features of FIG. 11 translate directly across to the side views of the single container devices. Pushing the containers 22, 46 and 48 in FIG. 7 together such that their walls are common creates the same principle system as indicated in FIGS. 8, 9 and 10 if it contained only three compartments with the outlet 126/142/143/144 positioned in chamber 130 and partition 128 extended to the top of container 121. These two separate embodiments of this device are the same principle, with only a slight difference in the the application.

The device shown in FIGS. 8, 9 and 10 has five compartments and 4 bottom sealed chambers. It is obvious to anyone skilled in the field that there is nothing special about this number and there can be any number of bottom sealed chambers and surface compartments built into the one container. The greater the number of chambers and or compartments the more the water can be treated or the longer the rest period for the pollutants to settle out. The one container can be used to put a different number of chambers and/or compartments depending upon the requirements of the water to be treated. For the same size container, fewer chambers and compartments means more water can be treated faster, with settling occurring outside the container. More chambers and compartments means that the water can be treated and rest inside the one container, giving a higher quality water before it is discharged.

It should be noted that the floc protection barriers can be vertical or angled as required. Their function is to reduce and/or minimize the floc flowing between cells, thus reducing the number of cells required.

In all of these arrangements, the use of open topped chambers may be used, some of which may contain electrodes across which an electric potential can be applied, thus generating a floc which floats to the surface. The chambers are preferably of approximately equal size and have some form of barrier that reduces the amount of floc flowing from chamber to chamber when the water flows between chambers. It is desirable that the water enters near the bottom of each chamber and passes out near the top. It is preferable that all the chambers have an equal hydrostatic level, such that water flowing through these chambers will be at substantially the same level in each compartment. This enables the level to be maintained by gravity and flow rate, rather than by the need for adjustment using pumps or some other process.

One of the successes to removing the floc from each of the tanks is to make sure that the water level of each tank is as close to the top of the container's overflow edge, 21, 121, as possible, without letting it overflow in normal operation. One way of achieving this is to use the adjustable height outlet indicated in items 142/143/144 connected to outlet 26, being the same as items 142/143/144 connected to outlet 128.

Another method of achieving this is shown in FIG. 11. The outlet 26 of the final container is positioned near the top of the container, at a level just below the top of the overflow surface 21. As water enters the first container it will continue to flow through the containers and out the outlet 26. The water will always flow out the outlet provided water is flowing in. A level sensor 82 may be placed above the upper level of the pipe to detect if the water flow through the system is too fast for the outlet. When it is too fast, the water level will rise and activate level sensor 82, which will then send a signal to a controller 85 through connection 83. In turn controller 85 will send a signal via 84 to the input pump 10 of FIG. 1, either slowing it down or stopping it until the water level has dropped sufficiently to de-activate level sensor 82. It is also possible to adjust the level at which the water will flow out 26 by putting a level adjustment feature in or at the end of 26. This can be something as simple as adjusting the height of a slightly flexible pipe, or rotating the position of an elbow at the end of the pipe.

The above have illustrated embodiments of the apparatus that allow the floc to remain on the surface. It is now necessary to remove that floc during operation. A desirable aspect of the apparatus is that the floc is collected in an orderly manner and does not simply flow everywhere. Illustrations of the mechanism of floc collection are given in items 160 and 161 of FIGS. 8, 9 and 12. A preferably sloping drain 161 is located below the floc overflow wall, 21, 121 as appropriate, substantially extending the length of the said wall. A drain pipe 160 can be connected at the bottom of drain 161, such that when the floc flows into drain 161, it flows down pipe 160 and is directed in any manner required for collection or disposal. In FIG. 9, it is connected to the same drain outlet from the bottom of the apparatus, giving a single waste collection stream. Other mechanisms are possible.

In normal operation, the surface of the water would be at or slightly below the overflow levels 21 or 121 of the containers. When operation goes over a long time period, the floc 170 builds up on the surface if it is not removed, as shown in FIG. 12. With the appropriately designed container, a good mechanism of removing the floc is illustrated in FIG. 12. Waves are generated by a paddle 168 at the side of the container opposite the overflow wall 121.

The waves forces some of the water over the edge, taking some of the floc with it and moving the floc near the wave generator towards the edge 121. The floc flows into the capture drain 161 and down the drain pipe 160, directed away for any suitable disposal method. In this instance the mechanism is driven by a motor 162 which drives a connecting rod 164, in this case by a cylinder 163 with an offset pivot point. Rod 164 is connected to a bar 165 which moves further connecting rods 166 through guides 167. The paddle 188 is attached to the end of the rods. As the motor turns, the paddle moves up and down and when appropriately positioned and moved at the appropriate rate for the appropriate time it generates a wave that moves the floc away from the paddle end of the container to the overflow end, sending some of the floc over the top of wall 121 into the drain 161. In this manner some of the floc is removed. The process can be repeated at convenient time intervals periodically removing the floc as it builds up in continuous operation.

The wave generation device shown in FIG. 12 can be employed in a number of different ways. One motor could power several paddles in different compartments or containers, removing the floc from them at the same time. Alternatively there could be separate motors for individual compartments or containers, or for small groups or compartments or containers, such that the floc from different parts of the process can be removed at different times. Any number of containers can be joined together into the one apparatus. This number could be 3, 4, 5, 6, 7, 8, 9, 10 or more. These could also be joined together in either series in which the water passes through different stages, or in parallel, in which case greater volumes of water can be treated simultaneously using smaller containers. In the same manner, it is obvious that a single container can be subdivided into any number of chambers and compartments, giving the same benefits as described for joining individual containers together.

To maintain the correct charge dosing per volume of water treated, it is important that the charge per unit volume of water treated always remains the same. The above has described the method by which the water flows into the system at a constant rate, the pollutants are captured in a floc that is floated to the surface and removed, and the water flows out again. It is important that the water receives a constant dose of electric charge per unit volume of water treated. For this to occur, the rate of charge delivery must be set to match the volume of water flowing and the dose required per unit volume of water and that the charge dose remains matched to the flow rate. This can be achieved by using constant current power supplies for the voltage applied across the plate sets. A constant current power supply can deliver the preset current by adjusting its voltage so that the delivered current is aways the same as the preset current. It will do this up to its maximum voltage capability.

Figure 13:
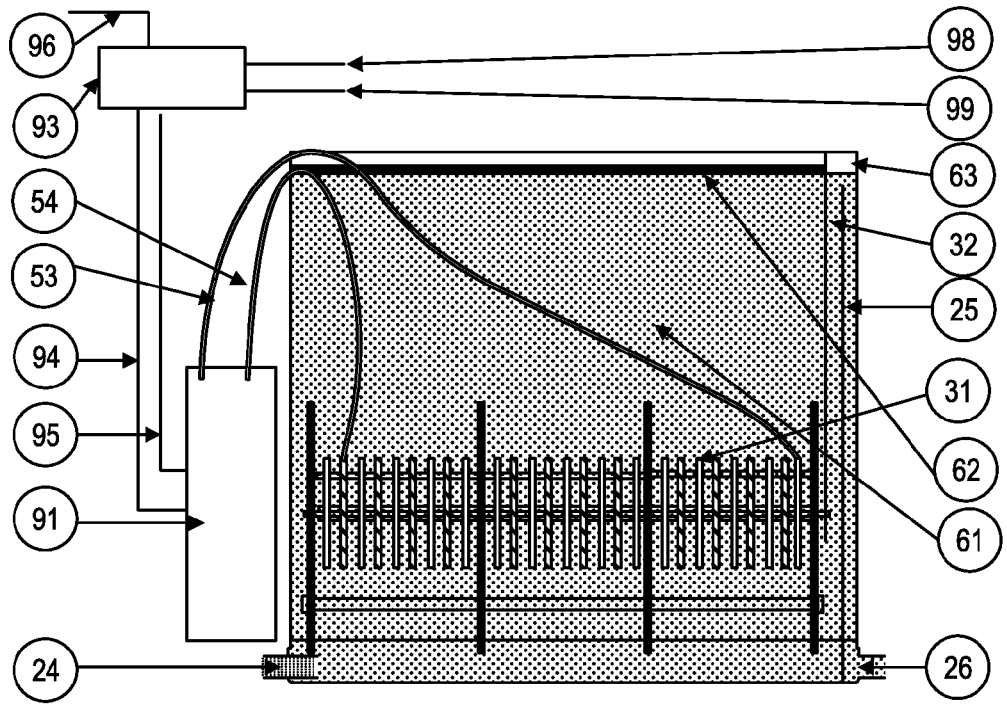
FIG. 13 is an illustration of an example mechanism to provide a controlled constant dose rate of electric charge.

As such, the use of a constant current power supply together with the constant flow method described above gives the capability to deliver the desired charge to the water all the time. However there is always the possibility that the plates in the plate sets could alter their properties such that the voltage required to maintain the desired constant current can no longer be delivered. To prevent the water from being under treated and not all the pollutants being removed, it is essential that the constant current power supply be monitored by a controller, as illustrated in FIG. 13.

A constant current power supply 91 delivers an electric charge at a given rate to plate set 31 via electrical leads 53 and 54. The rate at which the charge is delivered is monitored by a controller 93, via a connection 94. If the rate of charge varies, the controller may include the option to send a signal to the power supply to alter its voltage to bring the current to the desired level. In this manner the desired rate of delivery of electric charge can be maintained constant, within the capabilities of the power supply. If the current drops below the preset value because it exceeds the voltage capability of the power supply, the controller 93 sends a signal to controller 6, see FIG. 1, via connection 96, to slow down the pumping speed so that the water is pumped in at the rate at which the power supply is delivering charge to the plate sets 31. It also has another outlet 98, which sends a signal to any other controlled constant current power supplies, reducing the current they give out to match the lowered output of that power supply. In the event that another power supply is unable to generate the necessary current, the controller also has an input 99 whereby the outlet 98 from another power supply's controller sends a signal to this controller giving a signal for this controller to reduce its current output to match the current output of the power supply it controls to match the percentage reduction of the other power supply.

Figure 14:
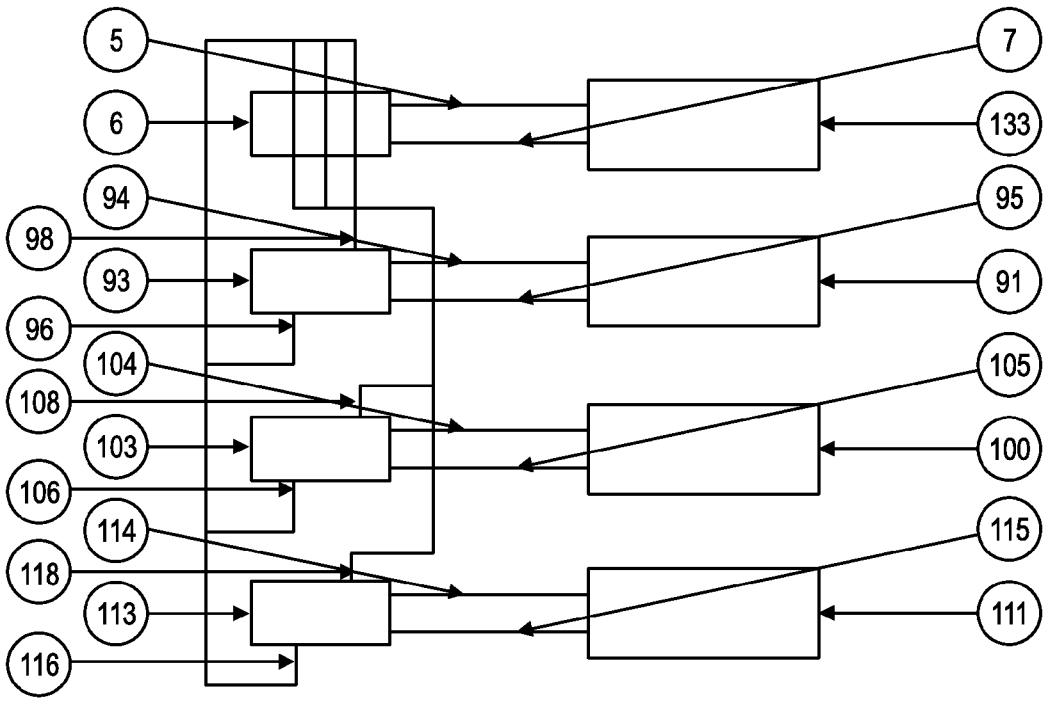
FIG. 14 is an illustration of an example control mechanism for a continuous flow electroflocculation based water treatment system that can provide a constant dose of electric charge to a given volume of water, which dose rate is determined by the volume of water flowing and the amount of pollutant in that water that needs to be removed.

FIG. 14 displays an example of the total control mechanism for three power supplies, 91, 101 and 111. Through connectors 5 and 7, controller 6 controls the flow mechanism 133, an example of which is given in FIG. 1. Through connectors 94 and 95, controller 93 controls power supply 91. Through connectors 104 and 105, controller 103 controls power supply 101. Through connectors 114 and 116, controller 113 controls power supply 111. Through connectors 96, 106 and 116, controllers 93, 103 and 113 respectively send their current status to controller 6. Through connectors 98, 108 and 118, controller 6 sends information to controllers 93, 103 and 113 respectively.

If one of the controllers 93, 103 or 113 senses that it is not delivering sufficient current to adequately treat the water, it sends a signal to controller 6 that it is unable to attain the adequate current and by how much that current is below its target setting. Controller 6 sends a signal to the pumping mechanism to slow the current down, preferably by the amount indicated by the controller with the low current. Controller 6 also sends a signal to the other controllers that are delivering adequate current to reduce their current according to the lowest current output signal. With each controller maintaining it control of its function and sending a signal to a master controller 6, which controller oversees all operations, it is apparent that the control ensures that all the water will receive the dose appropriate for satisfactory treatment.

In this manner, polluted water flows in through inlet 24, through the activated plate sets 31, generating floc that captures the pollutants and floats them to the surface. The floc 62 is removed by the system herein described and the water flows out the exit 26 substantially free of the pollutants present in it as it flowed in through the inlet 24. Should any of the parameters vary, for example one power supply is unable to give the correct charge dose for a given water flow rate, the system will adjust the parameters to ensure that the correct charge dose is given for all water passing through the system, ensuring that the water is adequately treated for the task at hand.

It is recognized that the process works best at a pH of approximately 7. Should the pH of the raw water be likely to be significantly different from 7, the water will need to be pH adjusted before it enters the water treatment apparatus. This is standard pH adjust facilities, which could be used as required. Similarly it may be desirable to dose the water with appropriate chemicals before treating it. Again liquid and/or gas chemical dosing facilities are standard equipment in the water treatment industry, there is nothing special about any of them and not mentioning specific chemicals that could be dosed should not exclude the use of such dosing if required.

Variations and/or modifications may be made to the embodiments described without departing from the spirit or ambit of the invention. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. An apparatus for removing pollutants from water, the apparatus comprising:
   a first container having a first water inlet for the water to flow into the container and a water outlet for the water to flow out of the container;
   a second container having a second water inlet that receives water from the first container; a first plurality of electrodes and a first regulated power supply arranged to apply an electric potential to the first plurality of electrodes to generate flocculating metal ions for removal of the pollutants from the water;
   a second plurality of electrodes and a second regulated power supply arranged to apply an electric potential to the second plurality of electrodes to generate flocculating metal ions for removal of the pollutants from the water; and
   a controller arranged to monitor and control the regulated supply, the controller being further arranged to adjust the rate at which water flows through the first water inlet to match a current passing through the water when the electric potential is so applied to provide the water being treated with a predetermined charge dose per unit volume of water;
   wherein the controller is arranged to determine when one of the first regulated power supply and the second regulated power supply is unable to provide a preset current and in response matching a percentage reduction in the current of the first regulated power supply or the second regulated power supply with the other, and adjust the rate at which water flows through one or more of the first and second water inlet, to provide the water being treated with a predetermined charge dose per unit volume of water.

2. An apparatus as defined by claim 1 in which the controller is arranged to monitor the current passed through the first plurality of electrodes and the second plurality of electrodes and the rate at which the water flows through one or more of the first and second container and adjust the current passed through the first plurality of electrodes and second plurality of electrodes such that the charge dose delivered to a volume of water by each of the first plurality of electrodes and the second plurality of electrodes is the same.

3. An apparatus defined by claim 1 wherein the first plurality of electrodes comprises an anode comprising steel and the second plurality of electrodes comprises an anode comprising aluminum.

4. An apparatus defined by claim 1 wherein water from the second container is received by a third container that has an outlet configured to have an adjustable height.

5. An apparatus defined by claim 1 arranged to adjust the rate at which water flows through one or more of the first and second water inlet such that a substantial portion of a floc having at least some the flocculating metal ions and at least some of the pollutants accumulate on the surface for subsequent removal.

6. An apparatus defined by claim 1 wherein one or more of the first and second regulated power supply is a controlled constant current power supply.

7. An apparatus defined by claim 1 wherein the controller is arranged to cause a charge density provided by one or more of the first and second plurality of electrodes to be less than 300 amps per square meter.

8. An apparatus defined by claim 1 wherein the controller is arranged to cause a charge density provided by one or more of the first and second plurality of electrodes to be less than 1000 amps per square meter.

9. An apparatus defined by claim 1 wherein the plurality of electrodes extends at least 50% of the distance between the water inlet and the water outlet.

10. A method for removing pollutants from water, the method comprising the steps of:
   flowing the water through a first container having a first water inlet;
   flowing the water through a second container having a second water inlet;
   generating flocculating metal ions for removal of the pollutants from the water by a first regulated power supply applying an electric potential to a first plurality of electrodes in the first container;
   generating flocculating metal ions for removal of the pollutants from the water by a second regulated power supply applying an electric potential to a second plurality of electrodes in the second container;
   monitoring and controlling the first and second regulated power supply;
   adjusting the rate at which water flows through the first water inlet to match a current passing through the water when the electric potential is so applied to provide the water being treated with a predetermined charge dose per unit volume of water; and
   determining when a predetermined current cannot be provided to one of the first plurality of electrodes and the second plurality of electrodes and in response matching a percentage reduction in the current of the first regulated power supply or the second regulated power supply with the other, and adjusting the rate at which water flows through one or more of the first and second water inlet, to provide the water being treated with a predetermined charge dose per unit volume of water.

11. A method defined by claim 10 comprising the steps of monitoring the current passed through the first plurality of electrodes and the second plurality of electrodes and the rate at which the water flows through one or more of the first and second container and adjusting the current passed through the first plurality of electrodes and second plurality of electrodes such that the charge dose delivered to a volume of water by each of the first plurality of electrodes and the second plurality of electrodes is the same.

12. A method defined by claim 10 comprising the step of water from the second container being received by a third container and adjusting the height of an outlet of the third container.

13. A method defined by claim 10 wherein the first plurality of electrodes comprises an anode comprising steel and the second plurality of electrodes comprises an anode comprising aluminum.

14. A method defined by claim 10 comprising the step of adjusting the rate at which water flows through one or more of the first and second water inlet such that a substantial portion of a floc having at least some the flocculating metal ions and at least some of the pollutants accumulate on the surface for subsequent removal.

15. A method defined by claim 10 wherein one or more of the first and second regulated power supply is a controlled constant current power supply.

16. A method defined by claim 10 comprising the step of one or more of the first and second plurality of electrodes providing a charge density of less than 300 amps per square meter.

17. A method defined by claim 10 comprising the step of one or more of the first and second plurality of electrodes providing a charge density of less than 1000 amps per square meter.

18. A method defined by claim 10 wherein generating flocculating metal ions comprises the step of generating at least one of iron ions and aluminum ions.

* * * * *